United States Patent
Kotovsky

(10) Patent No.: US 7,311,009 B2
(45) Date of Patent: Dec. 25, 2007

(54) MICROELECTROMECHANICAL SYSTEMS CONTACT STRESS SENSOR

(75) Inventor: Jack Kotovsky, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 70 days.

(21) Appl. No.: 11/143,543

(22) Filed: Jun. 1, 2005

(65) Prior Publication Data
US 2006/0107752 A1 May 25, 2006

Related U.S. Application Data

(60) Provisional application No. 60/629,271, filed on Nov. 17, 2004.

(51) Int. Cl.
G01L 1/18 (2006.01)
(52) U.S. Cl. ............... 73/777; 73/774; 73/763; 438/50
(58) Field of Classification Search .......... 73/777, 73/774, 763; 438/50, 51, 52, 53
See application file for complete search history.

(56) References Cited

U.S. PATENT DOCUMENTS

| 4,896,098 | A | 1/1990 | Haritonidis et al. |
| 4,899,125 | A | 2/1990 | Kurtz |
| 5,199,298 | A | 4/1993 | Ng et al. |
| 5,511,428 | A | 4/1996 | Goldberg et al. |
| 5,616,514 | A * | 4/1997 | Muchow et al. ............... 438/50 |
| 5,726,480 | A * | 3/1998 | Pister ........................ 257/415 |
| 5,771,902 | A * | 6/1998 | Lee et al. .................... 128/897 |
| 5,883,310 | A * | 3/1999 | Ho et al. ....................... 73/766 |
| 6,007,728 | A | 12/1999 | Liu et al. |
| 6,272,936 | B1 | 8/2001 | Oreper et al. |
| 6,475,639 | B2 | 11/2002 | Shahinpoor et al. |
| 6,545,495 | B2 | 4/2003 | Warmack et al. |
| 6,736,015 | B1 | 5/2004 | Repperger et al. |
| 6,953,982 | B1* | 10/2005 | Tai et al. ..................... 257/522 |
| 2001/0032509 | A1* | 10/2001 | Fujii ........................ 73/514.32 |
| 2002/0094701 | A1* | 7/2002 | Biegelsen et al. ............ 439/32 |
| 2002/0185712 | A1* | 12/2002 | Stark et al. ................. 257/642 |

(Continued)

FOREIGN PATENT DOCUMENTS

JP 61066135 4/1986

(Continued)

OTHER PUBLICATIONS

Jiang, K., et al., "A Flexible Mems Technology and its First Application to Shear Stress Sensor Skin," IEEE, 1997, pp. 465-470.

(Continued)

*Primary Examiner*—Edward Lefkowitz
*Assistant Examiner*—Punam Patel
(74) *Attorney, Agent, or Firm*—Eddie E. Scott; John H. Lee

(57) ABSTRACT

A microelectromechanical systems stress sensor comprising a microelectromechanical systems silicon body. A recess is formed in the silicon body. A silicon element extends into the recess. The silicon element has limited freedom of movement within the recess. An electrical circuit in the silicon element includes a piezoresistor material that allows for sensing changes in resistance that is proportional to bending of the silicon element.

4 Claims, 7 Drawing Sheets

U.S. PATENT DOCUMENTS

| | | | |
|---|---|---|---|
| 2003/0032293 A1* | 2/2003 | Kim et al. | 438/694 |
| 2004/0152211 A1* | 8/2004 | Majumdar et al. | 436/518 |
| 2005/0130360 A1* | 6/2005 | Zhan et al. | 438/197 |
| 2005/0150280 A1* | 7/2005 | Tang et al. | 73/105 |
| 2005/0190152 A1* | 9/2005 | Vaganov | 345/157 |
| 2005/0253206 A1* | 11/2005 | Bureau et al. | 257/414 |
| 2006/0071286 A1* | 4/2006 | Axelrod et al. | 257/414 |

FOREIGN PATENT DOCUMENTS

| | | |
|---|---|---|
| WO | WO 03/062135 A1 | 7/2003 |

OTHER PUBLICATIONS

Manouel, M., et al., "A Miniature Piezoelectric Polymer Transducer for In Vitro Measurement of the Dynamic Contact Stress Distribution," Journal of Biomechanics, vol. 25, No. 6, 1992, pp. 627-635.

Hetke, J. F., et al, "Flexible Miniature Ribbon Cables for Long-term Connection to Implantable Sensors," Sensors and Actuators, A21-A23, 1990, pp. 999-1002.

Leineweber, M., et al., "New Tactile Sensor Chip with Silicone Rubber Cover," Sensors and Actuators, 84, 2000, pp. 236-245.

Hetke, J. F., et al., "Silicon Ribbon Cables for Chronically Implantable Microelectrode Arrays," IEEE Transactions on Biomedical Engineering, vol. 41, No. 4, Apr. 1994.

Lee, M. H., et al., "Tactile Sensing for Mechatronics—A State of the Art Survey," Mechatronics 9, 1999, pp. 1-31.

Hsieh, M. C., et al., "The Development of a New Contact Type Piezoresistive Micro-Shear-stress Sensor," Proc. SPIE, vol. 4755, 2002, pp. 285-295.

* cited by examiner

MICROELECTROMECHANICAL SYSTEMS CONTACT STRESS SENSOR

CROSS-REFERENCE TO RELATED APPLICATIONS

This application claims the benefit of U.S. Provisional Patent Application No. 60/629,271 filed Nov. 17, 2004 and titled "MicroElectroMechanical Systems Contact Stress Sensor." U.S. Provisional Patent Application No. 60/629,271 filed Nov. 17, 2004 and titled "MicroElectroMechanical Systems Contact Stress Sensor" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to stress sensors and more particularly to a microelectromechanical systems stress sensor.

2. State of Technology

U.S. Pat. No. 6,272,936 issued Aug. 14, 2001 to Boris Oreper and John Brennenman and assigned to Tekscan, Inc., provides the following state of technology information: "There are many applications where a need exists to detect pressure between two contacting surfaces, either at a single point, or at a plurality of points so as to provide a pressure profile. Such applications include detecting pressure at gaskets, seals, and other contacting surfaces in various industrial equipment for alignment, adjustment, various other set-up functions, testing, maintenance, and the like; in research facilities for measurement and testing of various products; and in medical facilities for measuring and testing such things as foot pressure distribution, dental occlusion and the like. While pressure sensors for certain of these applications are fabricated as a matrix array, many of these applications require only one or more button sensors, the output or outputs from which are read locally, are fed to a computer, either directly or indirectly, or are otherwise utilized."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Research and industrial groups often need to sense and/or measure the stress between contacting surfaces. Instrumentation to perform this measurement is limited and there is a distinct need for improvement. In general, there are two basic approaches to directly measure contact stresses. The first replaces a portion of one of the contacting materials with a sensor at the materials' interface. Large sensors may be used for this technique but it is difficult for the sensor to assume the material properties of the original material it replaces and thus the contact mechanics change. This limitation poses an enormous limitation to this technique with the advantage of being able to use a relatively large sensor. The second approach leaves the original contacting materials and surfaces intact and attempts to introduce a minimal sensor at the interface to measure contact stress. The sensor must be very small (thin) to not change the interface stress as introduction of a bulky sensor at the contact interface will likely change the contact mechanics. A successful sensor needs to be minimally small and low in stiffness to allow conformability.

The present invention provides a microelectromechanical systems stress sensor. The microelectromechanical systems stress sensor comprises a microelectromechanical systems body, a recess in the body, an element that extends into the recess with the element having limited freedom of movement within the recess, and an electrical circuit in the element with the electrical circuit including a piezoresistor material. In one embodiment of the invention a beam extends into the recess and an electrical circuit including a piezoresistor material detects stress. The beam in one embodiment is a cantilevered beam and in another embodiment is a doubly supported beam. In another embodiment of the invention the element that extends into the recess is a diaphragm. In another embodiment of the invention the element that extends into the recess is a silicon body. In another embodiment of the invention the element that extends into the recess is a compliant material body. In another embodiment of the invention the element that extends into the recess is a silicone body. In another embodiment of the invention the element that extends into the recess is a body made of fabric. Another embodiment includes at least one additional recess in the microelectromechanical systems body, at least one additional silicon element that extends into the additional recess, and at least one additional electrical circuit in the additional silicon element, the additional electrical circuit includes a piezoresistor material.

The present invention also provides a method of producing a stress sensor. The method comprises the steps of microprocessing a silicon body to produce a recess in a silicon body, microprocessing the silicon body to produce a silicon element that extends into the recess and has a limited freedom of movement within the recess, providing an electrical circuit including a piezoresistor material operatively connected to the silicon element, and providing a measuring unit for measuring changes in electrical properties of the electrical circuit. In another embodiment, the present invention includes providing additional silicon bodies and connecting the silicon body and the additional silicon bodies by flexible elements.

The present invention has use for any application that requires contact stress sensing or measurement. Examples of use of the present invention include joint contact stress research in animals and humans (medical applications), oncologic research and drug monitoring, roller systems, automotive (engine component stresses, i.e., head gasket loads), robotic tactile sensing, footwear design, fastener design, etc.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
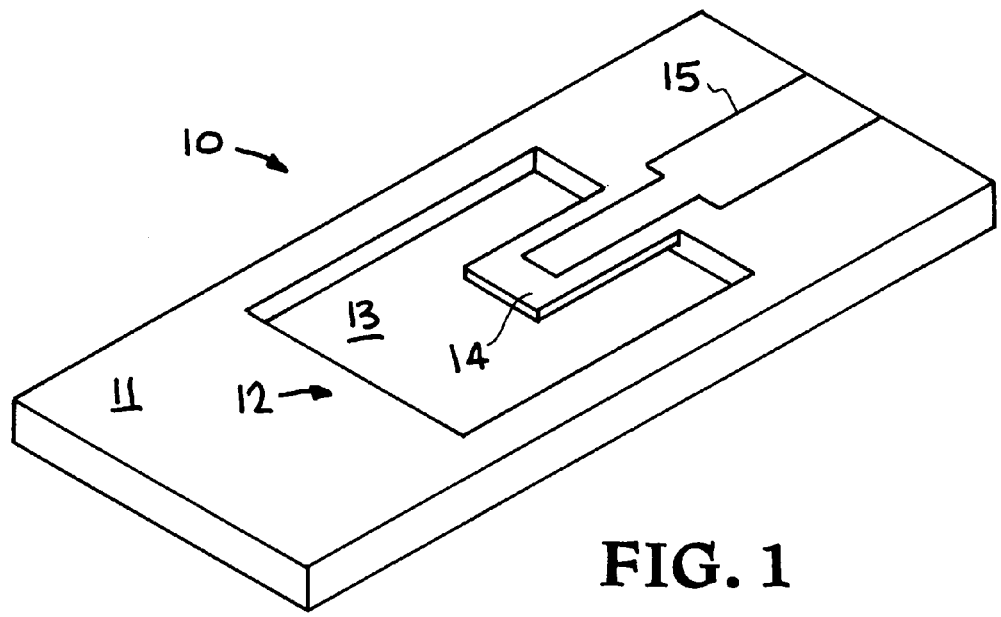
FIGS. 1-3 illustrate one embodiment of a microelectromechanical systems stress senor apparatus constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Figure 2:
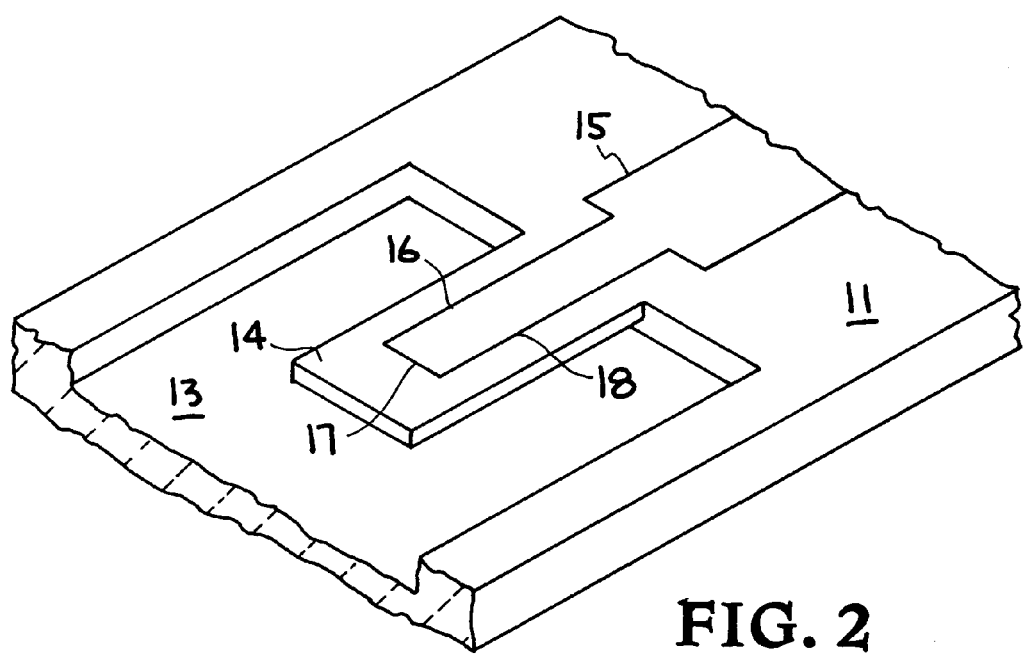
Figure 3:
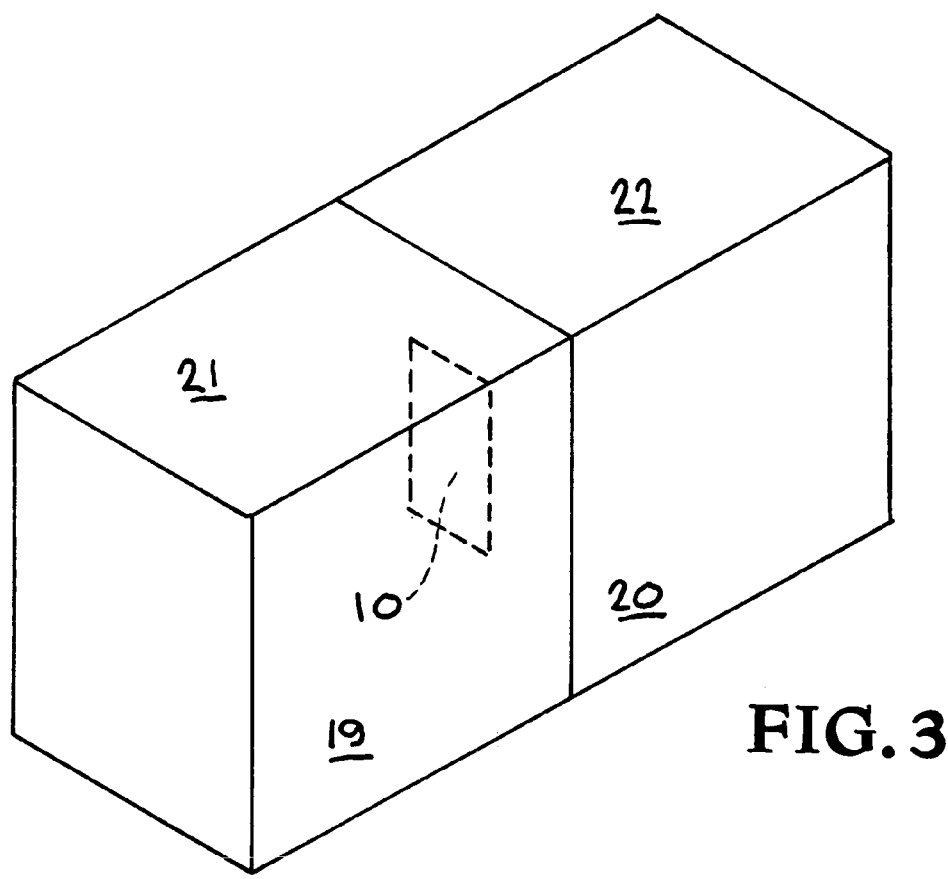

Referring now to FIGS. 1-3, one embodiment of a microelectromechanical systems stress senor apparatus constructed in accordance with the present invention is illustrated. The apparatus is designated generally by the reference numeral 10. As shown in FIG. 1, the apparatus 10 comprises a thin microelectromechanical systems silicon body 11. A recess 12 is formed in the silicon body 11. The recess 12 may be an indentation 12 with a floor 13 as shown in FIG. 1. In other embodiments of the invention, the recess 12 may be a hole that extends entirely through the silicon body 11 or the recess may be a groove that extends from an edge of the silicon body 11. A silicon beam 14 extends into the recess 12. The thickness of the beam 14 is less than the body 11. This provides for the top surface of the beam seeing load and the underside of the beam being shielded from load. With a floor 13 in place, the underside of the beam is protected from receiving load even if between compliant solids. The silicon beam 14 has limited freedom of movement within the recess 12 and above the floor 13 of the recess 12. An electrical circuit 15 is formed in the silicon beam 14. The electrical circuit 15 is comprised of a piezoresistor material.

The silicon beam 14 and the electrical circuit are illustrated in greater detail in FIG. 2. The silicon beam 14 extends from the thin silicon body 11 and has limited freedom of movement within the recess. The electrical circuit 15 extends along the length of the silicon beam 14. The electrical circuit 15 includes legs 16 and 18 that extend along the length of the silicon beam 14. An end portion 17 of the electrical circuit 15 connects the legs 16 and 18. The electrical circuit 15 is comprised of a piezoresistor material that allows for sensing changes in resistance that is proportional to bending of the silicon beam 14. This embodiment shown represents the cantilevered form of the beam. A doubly-supported beam may be used and the doped piezoresistor may be used in an 'out-and-back' geometry as shown for the cantilever. The piezoresistive trace may also extend across the doubly-supported beam. For p-type silicon, a heavy and light implant may be used to avoid offsetting resistance changes with load (the top center of the beam is in compression when the ends are in tension). For n-type silicon the positive and negative stresses formed at the beam's surface with load will not offset.

The apparatus 10 allows the measurement of stress between contacting surfaces. As illustrated in FIG. 3, the apparatus 10 is positioned between the members 19 and 20. The member 19 has an upper surface 21 and the member 20 has an upper surface 22. The abutting ends of the members 19 and 20 each have end surface. The apparatus 10 is positioned between the abutting end surfaces of the members 19 and 20.

The apparatus 10 allows the measurement of stress between contacting surfaces. It can be fabricated as a single device or as an array of microfabricated stress sensors that independently measure contact stress. The apparatus 10 includes doped piezoresistors embedded in cantilevered or doubly supported silicon beams. With applied normal loads, beam bending produces stress in the beam's surface and a corresponding change in resistance of the doped material. The change in resistance is calibrated to the applied load to provide a highly repeatable stress measurement. Due to silicon's mechanical and electrical properties, the apparatus 10 shows good accuracy, linearity and lack of hysteresis. Multiple independent apparatus 10 may be interconnected in a flexible and extensible array to allow conformity to complex and or compliant surfaces. The apparatus 10 is very thin which minimizes its effect on the stress distribution it measures. Flexible Kapton and Kapton cable connects can be used to encapsulate and communicate with the sensing devices. A technique of layered Kapton packaging produces a constant thickness device to maintain even load distributions. Tests have also been conducted with silicone rubber encapsulants that offer extensibility in addition to flexibility for the sensor package.

The details of one embodiment of an apparatus 10 for measuring stress constructed in accordance with the present invention having been described, the operation of the apparatus 10 and manufacture of the apparatus 10 will now be considered.

The apparatus 10 allows the measurement of stress between contacting surfaces. It can be fabricated as a single device or as an array of microfabricated stress sensors that independently measure contact stress. The apparatus 10 includes doped piezoresistors embedded in a cantilevered or doubly supported Silicon beam 14. An alternate embodiment includes doped piezoresistors embedded in a silicon diaphragm. With applied normal loads, beam bending produces stress in the beam's surface and a corresponding change in resistance of the doped material. The change in resistance is calibrated to the applied load to provide a highly repeatable stress measurement. Due to silicon's mechanical and electrical properties, the devices show good accuracy, linearity and lack of hysteresis. Where multiple apparatus 10 are utilized, the independent devices are interconnected in a flexible and extensible array to allow conformity to complex and or compliant surfaces. The array is very thin to minimize its effect on the stress distribution it measures. Flexible polyimide material, such as Kapton®, or Kapton® cable connects can be used to encapsulate and communicate with the sensing devices. A technique of layered Kapton® packaging produces a constant thickness device to maintain even load distributions. Tests have also been conducted with Silicone rubber encapsulates that offer extensibility in addition to flexibility for the sensor package.

The apparatus 10 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 10 also has use for Stockpile Stewardship testing and will help to assess load path issues in device performance. The apparatus 10 has use for any application that requires contact stresses sensing or measurement.

Figure 4:
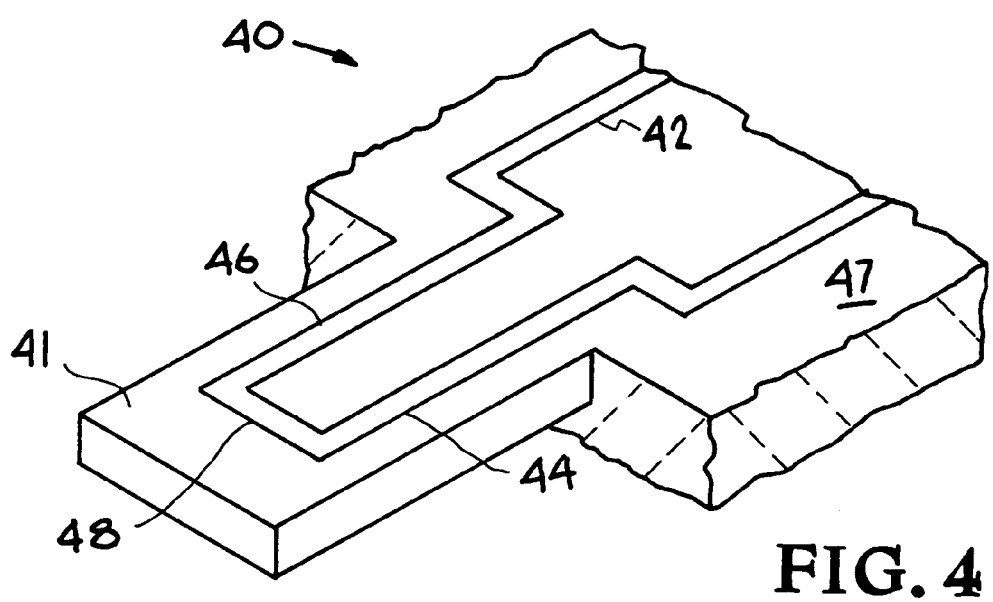
FIG. 4 illustrates another embodiment of a microelectromechanical systems stress sensor apparatus constructed in accordance with the present invention.

Referring now to FIG. 4, another embodiment of a microelectromechanical systems stress sensor apparatus constructed in accordance with the present invention is illustrated. The apparatus is designated generally by the reference numeral 40. The apparatus 40 allows the measurement of stress between contacting surfaces. The apparatus 40 has a thickness of only approximately 55 microns. It can be tuned to produce different bending sensitivity, thus allowing it to be employed between two surfaces in close proximity. Its low weight is also useful for space or other applications that demand low weight or high bandwidth measurements where instrument mass is an issue in second order dynamics.

Many research and industrial groups need to measure the stress between contacting surfaces. Instrumentation to perform this measurement is limited and there is a distinct need for improvement. In general, there are two basic approaches to measuring contact stresses. The first replaces a portion of one of the contacting materials with a sensor at the materials' interface. Large sensors may be used for this technique but it is difficult for the sensor to assume the material properties of the original material it replaces and thus the contact mechanics change. This limitation poses an enormous limitation to this technique with the advantage of being able to use a relatively large sensor.

The second approach leaves the original contacting materials and surfaces intact and attempts to introduce a minimal sensor at the interface to measure contact stress. The sensor must be very small (thin) to not change the interface stress as introduction of a bulky sensor at the contact interface will likely change the contact mechanics. A successful sensor needs to be minimally small and low in stiffness to allow conformability.

The apparatus 40 has many uses. For example, the apparatus 40 is useful for stewardship testing. It will help to assess load path issues in device performance. The apparatus 40 has use for Joint contact stress research in animals/humans (medical applications), in oncologic research and drug monitoring, in roller systems, in automotive (engine component stresses, i.e., head gasket loads), in robotic tactile sensing, in footwear design, in fastener design, and in athletic measurements such as golf swing and impact. The apparatus 40 has use in any application that requires contact stresses to be determined.

The apparatus 40 includes doped piezoresistors embedded in a cantilevered or doubly supported silicon beam 41. The silicon beam 41 extends from the body 47 of the apparatus 40 and has limited freedom of movement within a recess in the body of the apparatus 40. An electrical circuit 42 extends along the length of the silicon beam 41. The electrical circuit 42 includes legs 44 and 46 that extend along the length of the silicon beam 41. An end portion 48 of the electrical circuit 42 connects the legs 44 and 46. The electrical circuit 42 is comprised of a piezoresistor material 43 that allows for sensing changes in resistance that is proportional to bending of the silicon beam 41.

The apparatus 40 is based on silicon flexibility used as a displacement sensor. By doping the silicon surface of beam 41 with piezoresistors 43, the thin silicon beam 41 will produce a resistance change proportional to its bending. The apparatus 40 can be arranged like a cantilevered diving board where tip deflection due to contact with a moving part produces proportional resistance change.

The details of one embodiment of an apparatus 40 for measuring stress constructed in accordance with the present invention having been described, the manufacture of the apparatus 40 will now be considered. The apparatus 40 allows the measurement of stress between contacting surfaces. The apparatus 40 can be fabricated as a single device or as an array of microfabricated stress sensors that independently measure contact stress. The apparatus 40 can be produced utilizing a number of methods of manufacture, particularly MicroElectroMechanical Systems (MEMS) technology.

The first method of manufacture involves the formation of 3-dimensional structures in a single-crystal Silicon wafer. The process employs an anisotropic plasma etch of Silicon in a deep reactive ion etcher combined with an anisotropic Potassium Hydroxide (KOH) etch. The resulting shape is an undercut beam or bridge in Silicon. As MEMS technology is typically constrained to two dimensions, creation of an undercut, three dimensional structure in single crystal Silicon offers a variety of advantages and applications. Examples include transducers, resonators, accelerometers, stress sensors, flow sensors, actuators, atomic force microscopes, probes/needles, containers, and heaters/coolers.

Another method of manufacture is to plasma or wet etch a recess into a silicon chip to form a thinned diaphragm. The etch can be performed as a timed or measured etch or with use of a stopping layer like a buried oxide layer in a silicon-on-insulator wafer or a doped stopping layer. Both anisotropic and isotropic etchants may be used for this purpose, success has been demonstrated with a deep reactive ion etch that etches anisotropically.

An advantage of the diaphragm is that a full wheatstone bridge may be employed on the sensor. The four resistive legs allow for a closely balanced bridge and optimal thermal compensation. Various resistor arrangements may be employed to optimize load response or thermal stability. Aligning to the (110) direction of p-type silicon allows for maximum sensitivity to radial loads in the bending diaphragm. Alignment to (100) directions provides no response to radial loads. Tangential loads cancel to provide a thermally stable bridge with each resistor appearing identical.

Another method of manufacture involves a process of producing flexible silicon devices. A process has been developed that creates MEMS transducers on very thin substrates. One method of manufacture provides minimal silicon thickness or mass. The delicate substrate is a 4" Silicon wafer thinned to 55 microns or less by a grinding and polish process. This substrate is mounted temporarily on a rigid Silicon, quartz or other substrate. Photoresist is traditionally used to mount thin substrates on handle wafers. As silicon and MEMS processing place a variety of demands on the mounted substrates, a temporary glue layer connecting the thin substrate to its handle is difficult to achieve. Applicants utilize a wafer saw tape known as Dynatex Wafergrip for the temporary adhesive. This material was chosen for its adhesive strength and thermal continuity. MEMS processing frequently requires deep reactive ion etching. This process generates significant heat in the etched substrate (the thin substrate in this case). Cooling of this substrate is important to the success of the etch and the masking of the etch with temperature sensitive materials. Cooling is accomplished by a steady flow of Helium on the back of the substrate in contact with the machine's chuck. The joining layer between the thinned substrate and the handle thus provides a limit for the process as it acts as a thermal barrier. The wafergrip adhesion is the only reliable adhesive discovered for etching of thin substrates. Additionally, it withstands other processing such as photolithography and various short wet chemistry treatments. The use of Wafergrip offers significant advantages to photoresist mounting techniques. Other thin adhesives, glues and chemically resistant stick layers can be used as alternate embodiments to this concept.

The apparatus 40 is created based on the silicon flexibility and can be used as a displacement sensor. By doping the silicon surface with piezoresistors, the thin silicon beam 41 produces a resistance change proportional to its bending. The device 40 can be arranged with the beam 41 like a cantilevered diving board where tip deflection due to contact with a moving part produces proportional resistance change. The device 40 has a thickness of only 55 microns (approximately . . . thickness can be tuned to produce different bending sensitivity) allowing it to be employed between two surfaces in close proximity (for gap measurements). Its low weight also may be interesting for space or other applications that demand low weight or high bandwidth measurements where instrument mass is an issue in second order dynamics.

The contact stress sensor 40 is formed by producing a doped piezoresistor through the center of the doubly supported three dimensional beam described above. A more sensitive device can be formed by a resistive trace embedded in a cantilevered beam. Mechanical loads on the Silicon surface produce deflection of the microbeams relative to their supporting frames. The deflections produce strain in the Silicon and a proportional resistance change. For the doubly supported beam, two implants may be required to create a conductive region at the center of the beam and resistors at its ends. This prevents the positive and negative strains at the deflected beam's surface from not offsetting in p-type piezoresistors. The supportive frame is thicker than the microbeam at its center, the surface of the beam is identical to the surface of the chip. The underside of the beam is distant from the backside of the chip. Thus, equal loads on the top and bottom of the chip produce a differential load across the beam and beam deflection. The hole beneath the beam can either be a through chip hole or a blind hole. The design of the shape of the hole may affect sensitivity and performance of the chip for different applications. The supporting frame around the beam can be mechanically isolated from a bending array to insure bending of the array does not produce beam strain (i.e., that bending the array so that it conforms to a curved surface does not produce beam signal intended to measure applied normal loads only). The size of the hole surrounding the beam may affect shear sensitivity and should be designed for the application. The hole size may also affect the beam's sensitivity to normal loads depending on the compliant layer above it. A compliant layer above the beam helps to transfer load to the beam's surface and may affect device sensitivity. Thus the packaging of the sensor may be important.

Figure 5:
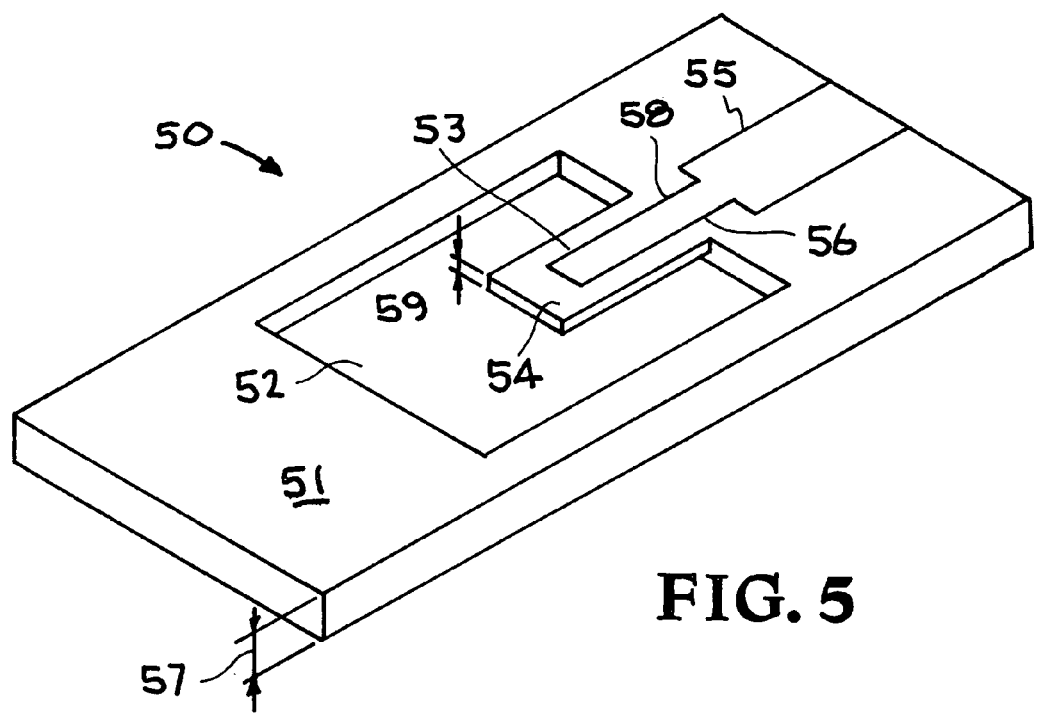
FIG. 5 illustrates another embodiment of a cantilevered beam microelectromechanical systems stress senor apparatus constructed in accordance with the present invention.

Referring now to FIG. 5, another embodiment of a microelectromechanical systems stress senor apparatus constructed in accordance with the present invention is illustrated. The apparatus is designated generally by the reference numeral 50. As shown in FIG. 5, the apparatus 50 comprises a thin microelectromechanical systems silicon body 51. A recess 52 is formed in the silicon body 51. The recess 52 may be an indentation with a floor, the recess 52 may be a hole that extends entirely through the silicon body 51, or the recess may be a groove that extends from an edge of the silicon body 51. A silicon beam 54 extends into the recess 52.

The silicon beam 54 extends from the silicon body 51 and has limited freedom of movement within the recess 52. The electrical circuit 55 extends from the silicon body 51 into and along the length of the silicon beam 54. The electrical circuit 55 includes legs 56 and 58 for connection to detection and measuring equipment and a piezoresistor material 53 section that extends along the length of the silicon beam 54. The piezoresistor material 53 allows for sensing changes in resistance of the electrical circuit 55 that is proportional to bending of the silicon beam 54. The embodiment shown in FIG. 5 represents the cantilevered form of the beam. In other embodiments, a doubly-supported beam is used. The doped piezoresistor 53 can be used in an 'out-and-back' geometry as shown for the cantilever. The piezoresistive material 53 may also extend across the doubly-supported beam. For p-type silicon, a heavy and light implant may be used to avoid offsetting resistance changes with load (the top center of the beam is in compression when the ends are in tension). For n-type silicon the positive and negative stresses formed at the beam's surface with load will not offset.

The apparatus 50 allows the measurement of stress between contacting surfaces. It can be fabricated as a single device or as an array of microfabricated stress sensors that independently measure contact stress. The apparatus 50 includes doped piezoresistors 53 embedded in cantilevered or doubly supported silicon beams 54. With applied normal loads, beam bending produces stress in the beam's surface and a corresponding change in resistance of the doped material 53. The change in resistance is calibrated to the applied load to provide a highly repeatable stress measurement. Due to silicon's mechanical and electrical properties, the apparatus 50 shows good accuracy, linearity and lack of hysteresis. Multiple independent apparatus 50 may be interconnected in a flexible and extensible array to allow conformity to complex and or compliant surfaces. The apparatus 50 is very thin which minimizes its effect on the stress distribution it measures. Flexible Kapton and Kapton cable connects can be used to encapsulate and communicate with the sensing devices. A technique of layered Kapton packaging produces a constant thickness device to maintain even load distributions. Tests have also been conducted with silicone rubber encapsulants that offer extensibility in addition to flexibility for the sensor package.

The silicon body 51 has a thickness 57. The thickness 59 of the silicon beam 54 is less than the thickness 57 of the body 51. This provides for the top surface of the beam seeing load and the underside of the beam being shielded from load. The silicon beam 54 is produced by etching the silicon body 51 to form the silicon beam 54. The etching process provides a system for producing the cantilevered beam 54 with the thickness 59 that is less than the thickness 57 of the body 51.

The details of one embodiment of an apparatus 50 for measuring stress constructed in accordance with the present invention having been described, the operation of the apparatus 50 and manufacture of the apparatus 50 will now be considered.

The apparatus 50 allows the measurement of stress between contacting surfaces. It can be fabricated as a single device or as an array of microfabricated stress sensors that independently measure contact stress. The apparatus 50 includes doped piezoresistors 53 embedded in a cantilevered or doubly supported silicon beam 54. An alternate embodiment includes doped piezoresistors embedded in a doubly supported beam or a silicon diaphragm. With applied normal loads, beam bending produces stress in the beam's surface and a corresponding change in resistance of the doped material. The change in resistance is calibrated to the applied load to provide a highly repeatable stress measurement. Due to silicon's mechanical and electrical properties, the devices show good accuracy, linearity and lack of hysteresis. Where multiple apparatus 50 are utilized, the independent devices are interconnected in a flexible and extensible array to allow conformity to complex and or compliant surfaces. The array is very thin to minimize its effect on the stress distribution it measures. Flexible polyimide material, such as Kapton®, or Kapton® cable connects can be used to encapsulate and communicate with the sensing devices. A technique of layered Kapton® packaging produces a constant thickness device to maintain even load distributions. Tests have also been conducted with Silicone rubber encapsulates that offer extensibility in addition to flexibility for the sensor package.

The apparatus 50 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 50 also has use for Stockpile Stewardship testing and will help to assess load path issues in device performance. The apparatus 50 has use for any application that requires contact stresses sensing or measurement.

Figure 6:
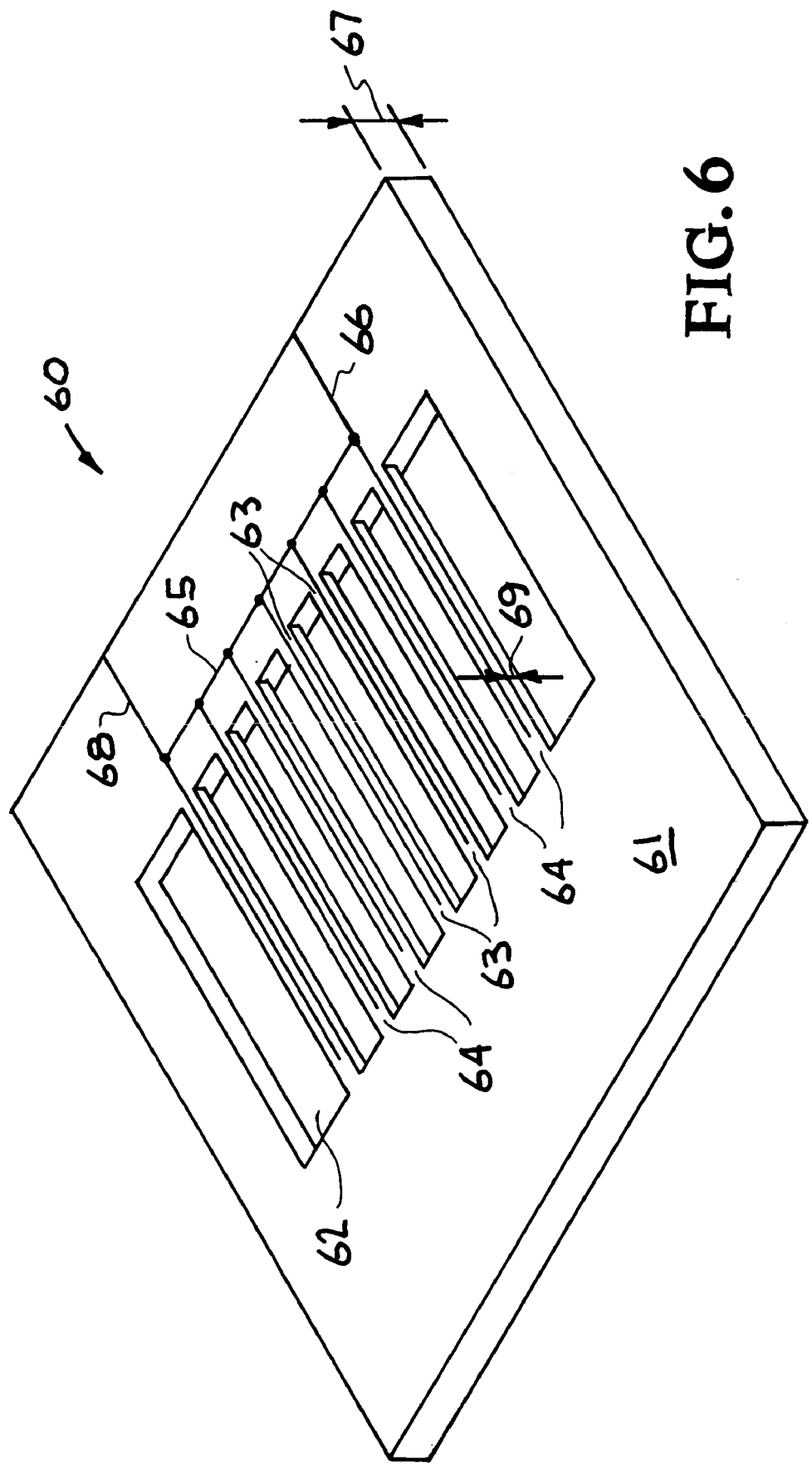
FIG. 6 illustrates another embodiment of a microelectromechanical systems stress senor apparatus constructed in accordance with the present invention in the form of a doubly-supported beam.

Referring now to FIG. 6, another embodiment of a microelectromechanical systems stress senor apparatus constructed in accordance with the present invention is illustrated. The apparatus is designated generally by the reference numeral 60. As shown in FIG. 6, the apparatus 60 comprises a thin microelectromechanical systems silicon body 61. A recess 62 is formed in the silicon body 61. The recess 62 may be an indentation with a floor, the recess 62 may be a hole that extends entirely through the silicon body 61, or the recess may be a groove that extends from an edge of the silicon body 61. A series of doubly supported silicon beams 64 extend into the recess 62.

The silicon beams 64 extend from the silicon body 61 and have limited freedom of movement within the recess 62. An electrical circuit 65 extends from the silicon body 61 into and along the length of each of the silicon beams 64. The electrical circuit 65 includes legs 66 and 68 for connection to detection and measuring equipment and a piezoresistor material 63 section that extends along the length of each of the silicon beams 64. The piezoresistor material 63 allows for sensing changes in resistance of the electrical circuit 65 that is proportional to bending of the silicon beams 64. The embodiment shown in FIG. 6 represents the doubly-supported beams is used. The doped piezoresistor 63 is an 'out-and-back' geometry as shown. The piezoresistive material 63 may also extend across the doubly-supported beams. For p-type silicon, a heavy and light implant may be used to avoid offsetting resistance changes with load (the top center of the beams is in compression when the ends are in tension). For n-type silicon the positive and negative stresses formed at the beam's surface with load will not offset.

The apparatus 60 allows the measurement of stress between contacting surfaces. It can be fabricated as a single device or as an array of microfabricated stress sensors that independently measure contact stress. The apparatus 60 includes doped piezoresistors 63 embedded in the doubly supported silicon beams 64. With applied normal loads, the beams bending produces stress in the beam's surface and a corresponding change in resistance of the doped material 63. The change in resistance is calibrated to the applied load to provide a highly repeatable stress measurement. Due to silicon's mechanical and electrical properties, the apparatus 60 shows good accuracy, linearity and lack of hysteresis. Multiple independent apparatus 60 may be interconnected in a flexible and extensible array to allow conformity to complex and or compliant surfaces. The apparatus, 60 is very thin which minimizes its effect on the stress distribution it measures. Flexible Kapton and Kapton cable connects can be used to encapsulate and communicate with the sensing devices. A technique of layered Kapton packaging produces a constant thickness device to maintain even load distributions. Tests have also been conducted with silicone rubber encapsulants that offer extensibility in addition to flexibility for the sensor package.

The details of the embodiment of an apparatus 60 for measuring stress constructed in accordance with the present invention having been described, the operation of the apparatus 60 and manufacture of the apparatus 60 will now be considered.

The silicon body 61 has a thickness 67. The thickness 69 of each of the silicon beams 64 is less than the thickness 67 of the body 61. This provides for the top surface of the beams seeing load and the underside of the beams being shielded from load. The silicon beams 64 are produced by etching the silicon body 61 to form the silicon beams 64. The etching process provides a system for producing the doubly supported beams 64 with the thickness 69 that is less than the thickness 67 of the body 61.

The apparatus 60 allows the measurement of stress between contacting surfaces. It can be fabricated as a single device or as an array of microfabricated stress sensors that independently measure contact stress. The apparatus 60 includes doped piezoresistors 63 embedded in the doubly supported silicon beams 64. An alternate embodiment includes doped piezoresistors embedded in a silicon diaphragm. With applied normal loads, the beams bending produces stress in the beam's surface and a corresponding change in resistance of the doped material. The change in resistance is calibrated to the applied load to provide a highly repeatable stress measurement. Due to silicon's mechanical and electrical properties, the devices show good accuracy, linearity and lack of hysteresis. Where multiple apparatus 60 are utilized, the independent devices are interconnected in a flexible and extensible array to allow conformity to complex and or compliant surfaces. The array is very thin to minimize its effect on the stress distribution it measures. Flexible polyimide material, such as Kapton®, or Kapton® cable connects can be used to encapsulate and communicate with the sensing devices. A technique of layered Kapton® packaging produces a constant thickness device to maintain even load distributions. Tests have also been conducted with Silicone rubber encapsulates that offer extensibility in addition to flexibility for the sensor package.

The apparatus 60 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 60 also has use for Stockpile Stewardship testing and will help to assess load path issues in device performance. The apparatus 60 has use for any application that requires contact stresses sensing or measurement.

Figure 7:
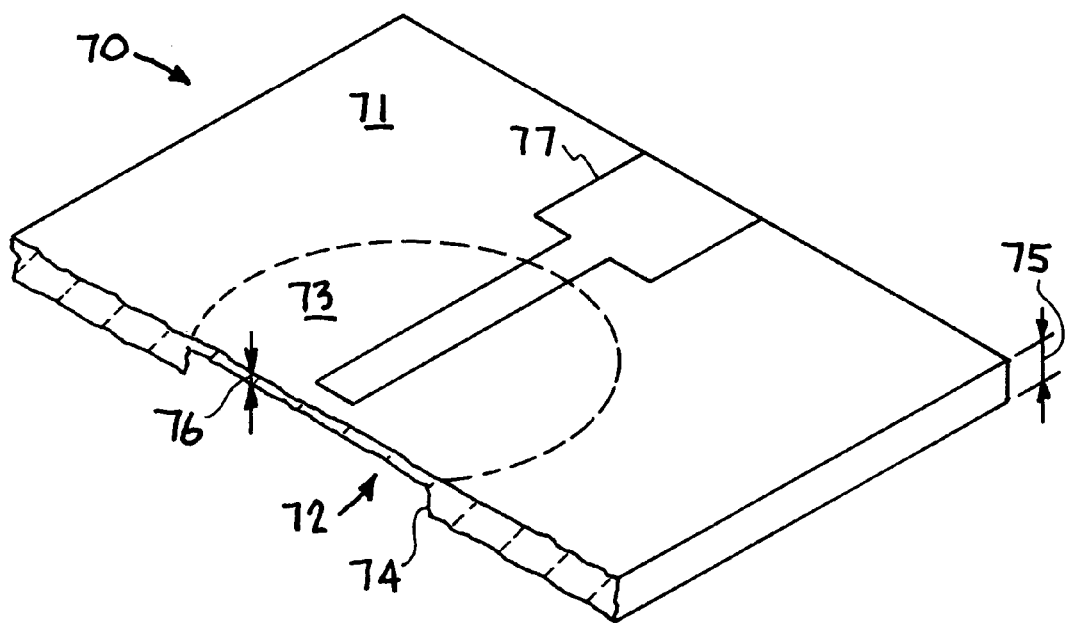
FIG. 7 illustrates another embodiment of a microelectromechanical systems stress senor apparatus constructed in accordance with the present invention in the form of a flexible diaphragm.

Referring now to FIG. 7, another embodiment of a microelectromechanical systems stress sensor apparatus constructed in accordance with the present invention is illustrated. The apparatus is designated generally by the reference numeral 70. As shown in FIG. 7, the apparatus 70 comprises a thin microelectromechanical systems silicon body 71. A recess 72 is formed in the silicon body 71. A flexible silicon diaphragm 73 is located in the recess 72.

The flexible silicon diaphragm 73 is formed in the silicon body 71 and has limited freedom of movement within the recess 72. An electrical circuit 77 is located on one side of the flexible silicon diaphragm 73. The electrical circuit 77 includes legs for connection to detection and measuring equipment and a piezoresistor material section that extends along the flexible silicon diaphragm 73. The piezoresistor material allows for sensing changes in resistance of the electrical circuit 77 that is proportional to bending of the flexible silicon diaphragm 73.

The apparatus 70 allows the measurement of stress between contacting surfaces. It can be fabricated as a single device or as an array of microfabricated stress sensors that independently measure contact stress. The apparatus 70 includes doped piezoresistors embedded in the flexible silicon diaphragm 73. With applied normal loads, the diaphragm's 73 bending produces stress in the diaphragm's surface and a corresponding change in resistance of the doped piezoresistor material. The change in resistance is calibrated to the applied load to provide a highly repeatable stress measurement. The apparatus 70 is very thin which minimizes its effect on the stress distribution it measures.

The details of the embodiment of an apparatus 70 for measuring stress constructed in accordance with the present invention having been described, the operation of the apparatus 70 and manufacture of the apparatus 70 will now be considered.

The silicon body 71 has a thickness 75. The thickness 76 of the flexible silicon diaphragm 73 is less than the thickness 75 of the body 71. The flexible silicon diaphragm 73 is produced by etching a hole 74 partially through the silicon body 71. The portion of the silicon body 71 remaining below the hole 74 produces the flexible silicon diaphragm 73. The etching process provides a system for producing the flexible silicon diaphragm 73 with the thickness 76 that is less than the thickness 75 of the body 71.

The apparatus 70 allows the measurement of stress between contacting surfaces. It can be fabricated as a single device or as an array of microfabricated stress sensors that independently measure contact stress. The apparatus 70 includes doped piezoresistors embedded in the flexible silicon diaphragm 73. With applied normal loads, the beams bending produces stress in the diaphragm's 73 surface and a corresponding change in resistance of the doped material. The change in resistance is calibrated to the applied load to provide a highly repeatable stress measurement. Due to silicon's mechanical and electrical properties, the devices show good accuracy, linearity and lack of hysteresis. Where multiple apparatus 70 are utilized, the independent devices are interconnected in a flexible and extensible array to allow conformity to complex and or compliant surfaces. The array is very thin to minimize its effect on the stress distribution it measures. Flexible polyimide material, such as Kapton®, or Kapton® cable connects can be used to encapsulate and communicate with the sensing devices. A technique of layered Kapton® packaging produces a constant thickness device to maintain even load distributions. Tests have also been conducted with Silicone rubber encapsulates that offer extensibility in addition to flexibility for the sensor package.

The apparatus 70 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 70 also has use for Stockpile Stewardship testing and will help to assess load path issues in device performance. The apparatus 70 has use for any application that requires contact stresses sensing or measurement.

Figure 8:
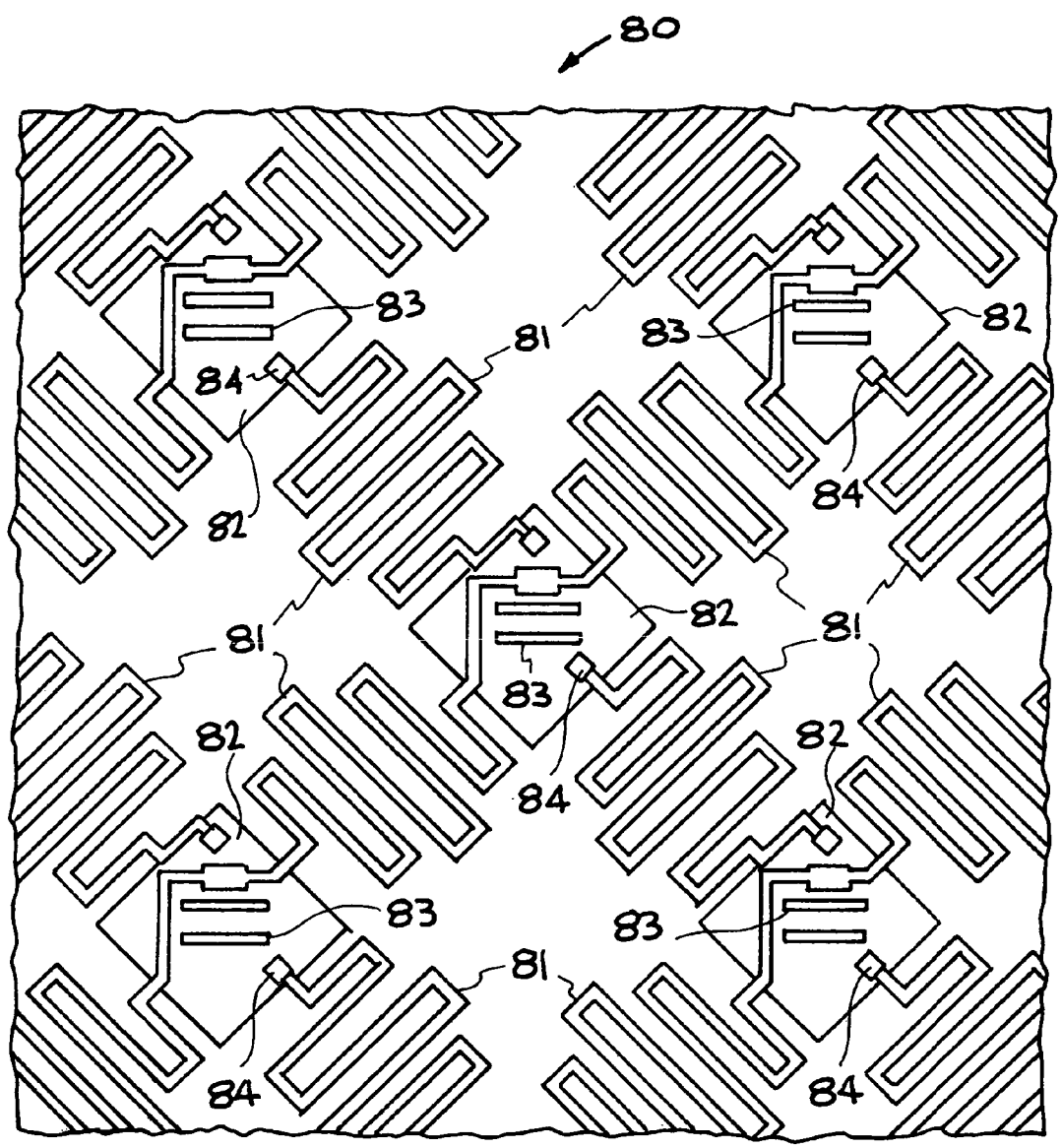
FIG. 8 illustrates an embodiment of the present invention with contact stress sensors connected by silicon microsprings.

Referring now to FIG. 8, a package is shown that includes embedded silicon chips that comprise microelectromechanical systems stress sensors. The package is generally designated by the reference numeral 80. The package 80 is primarily a three layer stack of polyimide film, such as Kapton®, with one layer carrying conductive metal 81 that provides springs connecting silicon chips 82 that include microelectromechanical systems stress sensors 83. The package 80 is uniform in thickness everywhere as the 80 micron thick chips 82 are encased in a polyimide film stack with matched thickness middle layer. The package 80 that is illustrated shows four embedded silicon chips 82 with the four individual microelectromechanical systems stress sensors 83. The individual microelectromechanical systems stress sensors 83 each have two, three or four connecting leads 84. The twelve wires can be accessed by a flex connector at the exposed metal tips. The individual microelectromechanical systems stress sensors 83 are stress sensors that independently measure contact stress such as the stress sensors shown in FIGS. 5, 6, and 7.

Flex circuits are common and direct mounting of silicon devices on flex circuits is common. This package 80 is entirely encased in the polyimide film so that the ensuing package is uniform in thickness. Maintaining package thickness uniformity is necessary for contact stress measurement. The first layer of polyimide film carries thin, patterned metal traces 81 that mate with metal contact pads on the surface of the chips 82. A second layer of polyimide film is cut to have holes identical in shape to the silicon part. It is aligned and adhered to the first polyimide film layer. The chip 82 is self-aligned to the metal traces 81 on polyimide film layer 1 (chip oriented metal side against the metal traces on the Kapton®) as it is constrained by the patterned holes through the polyimide film layer 2. Layer 2 is chosen to be the same thickness as the silicon part (approximately 55 microns). The metal on the silicon is soldered to the metal traces below through use of applied solder paste or electroplating solder (i.e., Indium or lead-tin or gold-tin) on the Kapton® metal traces (before or after polyimide film layer 2 is applied). Once soldered in place, the chip's surface is flush with the polyimide film layer 2 surface. The third Kapton® layer is applied to entirely encase the chip. Polyimide film layer 3 is patterned with through holes to provide access to the metal on Kapton® layer 1 (the same holes exist on polyimide film layer 2) where a connector will meet those traces.

Figure 9:
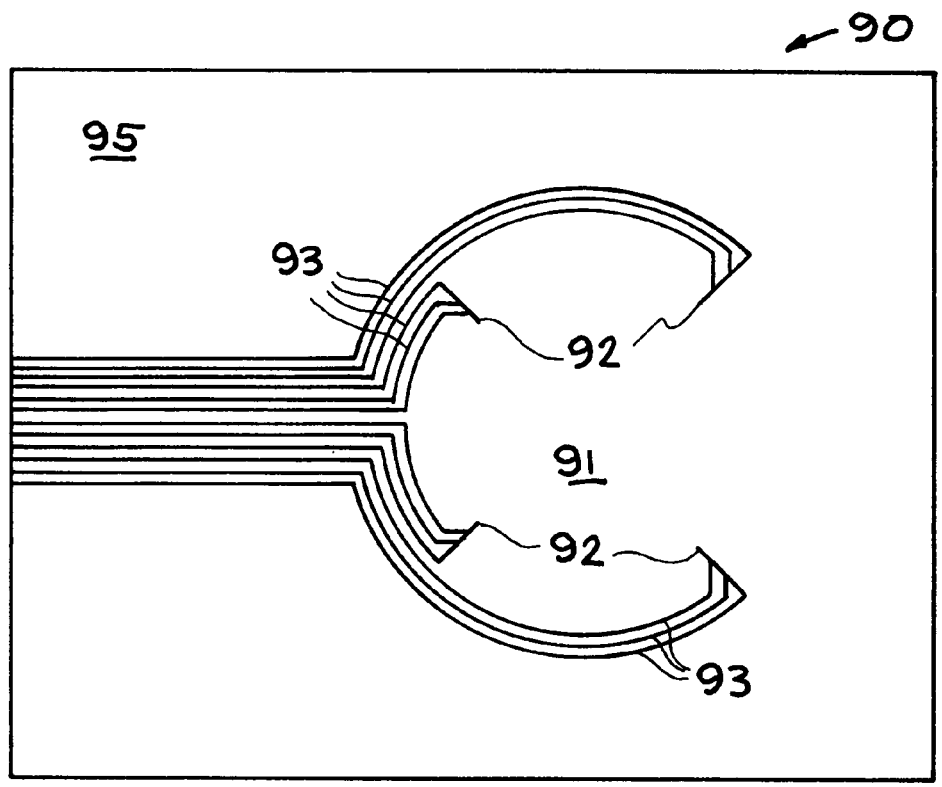
FIG. 9 illustrates an embodiment of the present invention.

Referring now to FIG. 9, another embodiment of a microelectromechanical systems stress senor apparatus constructed in accordance with the present invention is illustrated. The apparatus is designated generally by the reference numeral 90. The apparatus 90 utilizes a flexible silicon diaphragm 91 as described in connection with the microelectromechanical systems stress senor apparatus 70 previously described and illustrated in FIG. 7. The flexible silicon diaphragm 91 is formed in the thin microelectromechanical systems silicon body 95. The flexible silicon diaphragm 91 has limited freedom of movement within the silicon body 95.

An electrical circuit is located on the, flexible silicon diaphragm 91. The electrical circuit includes legs 93 for connection to detection and measuring equipment and a piezoresistor material section 92 that extends along the flexible silicon diaphragm 91. The piezoresistor material 92 allows for sensing changes in resistance of the electrical circuit that is proportional to bending of the flexible silicon diaphragm 91.

The apparatus 90 allows the measurement of stress between contacting surfaces. The apparatus 90 includes doped piezoresistors 93 embedded in the flexible silicon diaphragm 91. With applied normal loads, the diaphragm's 91 bending produces stress in the diaphragm's surface and a corresponding change in resistance of the doped piezoresistor material. The change in resistance is calibrated to the applied load to provide a highly repeatable stress measurement. The apparatus 90 is very thin which minimizes its effect on the stress distribution it measures.

The apparatus 90 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 90 also has use for Stockpile Stewardship testing and will help to assess load path issues in device performance. The apparatus 90 has use for any application that requires contact stresses sensing or measurement.

Figure 10:
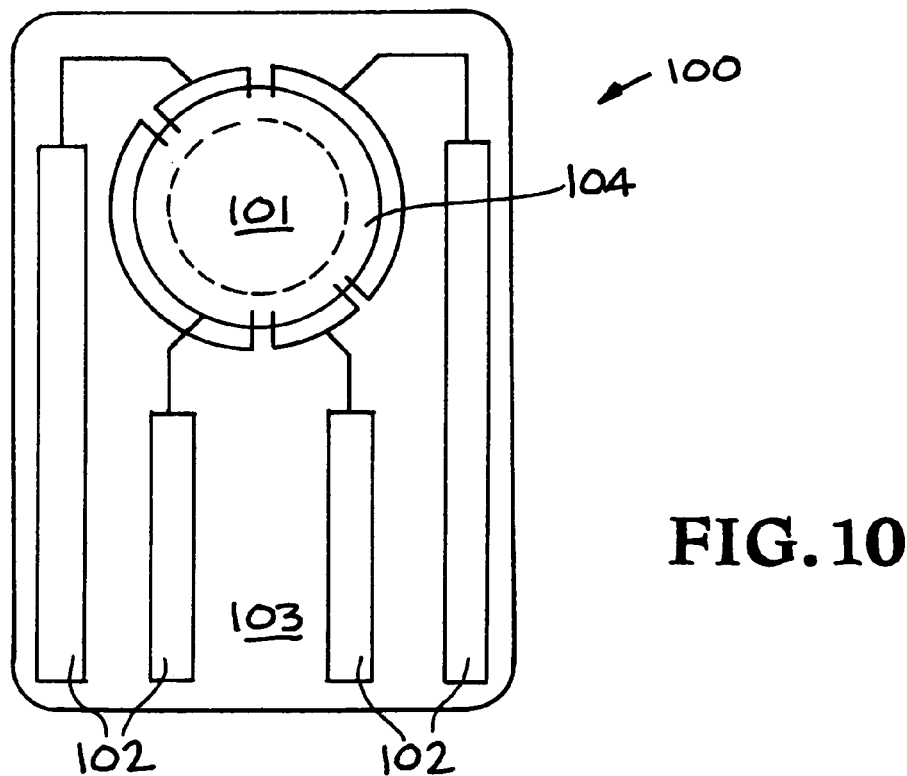
FIG. 10 illustrates another embodiment of a microelectromechanical systems stress sensor apparatus constructed in accordance with the present invention.

Referring now to FIG. 10, another embodiment of a microelectromechanical systems stress senor system constructed in accordance with the present invention is illustrated. The system is designated generally by the reference numeral 100. As shown in FIG. 10, the system 100 comprises a thin microelectromechanical systems silicon body 101.

The apparatus 100 utilizes a flexible silicon diaphragm 101 as described in connection with the microelectromechanical systems stress senor apparatus 70 previously described and illustrated in FIG. 7. The flexible silicon diaphragm 101 is formed in the thin microelectromechanical systems silicon body 103. The flexible silicon diaphragm 101 has limited freedom of movement within the silicon body 103.

An electrical circuit is connected to the flexible silicon diaphragm 101. The electrical circuit includes legs 102 for connection to detection and measuring equipment and a piezoresistor material section 103 that extends along the flexible silicon diaphragm as described in connection with the microelectromechanical systems stress senor apparatus 70 previously described and illustrated in FIG. 7. The piezoresistor material allows for sensing changes in resistance of the electrical circuit that is proportional to bending of the flexible silicon diaphragm 101.

The microelectromechanical systems stress senor apparatus 100 provides a full Wheatstone bridge chip with 700 um diameter diaphragm. Thermally compensating resistors are on (100) silicon axes for no radial load sensitivity but identical thermal response. Standoff metal disk centered on the diaphragm assures contact conformity between the device and its package or loading surface.

The apparatus 100 allows the measurement of stress between contacting surfaces. With applied normal loads, the diaphragm's 101 bending produces stress in the diaphragm's surface and a corresponding change in resistance of the doped piezoresistor material. The change in resistance is calibrated to the applied load to provide a highly repeatable stress measurement. The apparatus 100 is very thin which minimizes its effect on the stress distribution it measures.

The apparatus 100 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 100 also has use for Stockpile Stewardship testing and will help to assess load path issues in device performance. The apparatus 100 has use for any application that requires contact stresses sensing or measurement.

Figure 11:
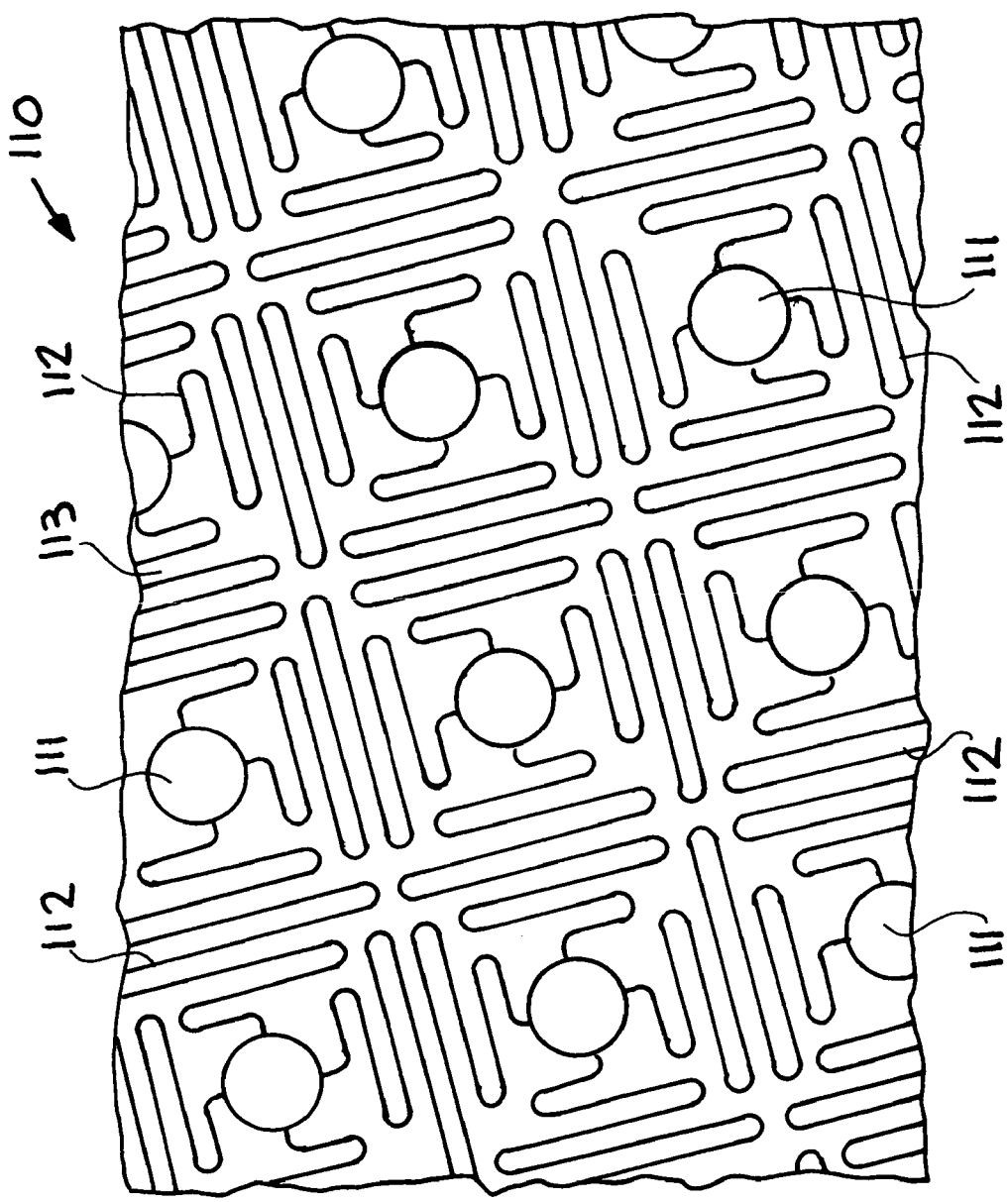
FIG. 11 illustrates another embodiment of a microelectromechanical systems stress sensor apparatus constructed in accordance with the present invention.

Referring now to FIG. 11, a package is shown that includes freestanding metal embodiment of the contact stress sensing array. The package is generally designated by the reference numeral 110. Independent islands of silicon round disks 111 are interconnected by freestanding metal springs 112. The array is supported on a compliant body 113. The compliant body 113 is made of a compliant material. For example, the compliant body 113 illustrated is a silicone rubber body 113. In other embodiments other packaging materials such as fabric may be employed.

The package 110 provides springs 111 connecting silicon chips 112 that include microelectromechanical systems stress sensors. The springs 111 provide an electrical circuit connected to the flexible diaphragm 111. The electrical circuit includes a piezoresistor material section that extends along the flexible silicon diaphragm 111. The piezoresistor material allows for sensing changes in resistance of the electrical circuit that is proportional to bending of the flexible silicon diaphragm 111.

Since the microelectromechanical systems stress sensors are supported on a silicone rubber body 113, the package 110 can be used in locations where there is a contoured surface. The apparatus 110 has use for joint contact stress research in animals and humans (medical applications), oncologic research and drug monitoring, roller systems, automotive (engine component stresses, i.e., head gasket loads), robotic tactile sensing, footwear design, fastener design, etc. The apparatus 110 also has use for Stockpile Stewardship testing and will help to assess load path issues in device performance. The apparatus 110 has use for any application that requires contact stresses sensing or measurement.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A microelectromechanical systems (MEMS) stress sensor apparatus comprising:
   at least two MEMS bodies, wherein each MEMS body comprises a MEMS cantilever silicon element that extends into a recess in said body, said MEMS cantilever silicon element having limited freedom of movement within said recess, and an electrical circuit in said MEMS cantilever silicon element, said electrical circuit including a piezoresistor material, wherein the at least two MEMS bodies are interconnected by at least one spring element.

2. A microelectromechanical systems (MEMS) stress sensor apparatus comprising:

at least two MEMS bodies, wherein each MEMS body comprises a compliant material body, a MEMS cantilever silicon element that extends into a recess in said body, said MEMS cantilever silicon element having limited freedom of movement within said recess, and an electrical circuit in said MEMS cantilever silicon element, said electrical circuit including a piezoresistor material, wherein the at least two MEMS bodies are interconnected by at least one flexible element in a flexible and extensible manner to allow conformity to complex or compliant surfaces.

3. A stress sensor apparatus comprising:

at least two microelectromechanical systems (MEMS) body means for providing a base, wherein each MEMS body means comprises a recess means for forming an open area, a MEMS cantilever silicon element means that extends into said recess means for limited movement, and an electrical circuit means in said MEMS cantilever silicon element means for sensing movement of said MEMS silicon element means, said electrical circuit means including a piezoresistor material, wherein the at least two MEMS body means are interconnected by at least one spring element.

4. A stress sensor apparatus comprising:

at least two microelectromechanical systems (MEMS) body means for providing a base, wherein each MEMS body means comprises a compliant material body, a recess means for forming an open area, a MEMS cantilever silicon element means that extends into said recess means for limited movement, and an electrical circuit means in said MEMS cantilever silicon element means for sensing movement of said MEMS silicon element means, said electrical circuit means including a piezoresistor material, wherein the at least two MEMS body means are interconnected by at least one flexible element in a flexible and extensible manner to allow conformity to complex or compliant surfaces.

* * * * *